United States Patent
Kawai et al.

(10) Patent No.: US 10,232,842 B2
(45) Date of Patent: Mar. 19, 2019

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Takashi Kawai, Gotemba (JP); Yusuke Kitazawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 97 days.

(21) Appl. No.: 15/401,437

(22) Filed: Jan. 9, 2017

(65) Prior Publication Data

US 2017/0203754 A1    Jul. 20, 2017

(30) Foreign Application Priority Data

Jan. 14, 2016   (JP) .................. 2016-005231

(51) Int. Cl.
| | |
|---|---|
| B60W 20/17 | (2016.01) |
| B60K 6/442 | (2007.10) |
| B60W 10/06 | (2006.01) |
| B60W 10/08 | (2006.01) |
| B60W 10/115 | (2012.01) |

(Continued)

(52) U.S. Cl.
CPC ............ *B60W 20/17* (2016.01); *B60K 6/442* (2013.01); *B60K 6/445* (2013.01); *B60W 10/06* (2013.01); *B60W 10/08* (2013.01); *B60W 10/115* (2013.01); *B60W 20/15* (2016.01); *B60W 20/20* (2013.01); *B60W 20/30* (2013.01); *B60W 30/20* (2013.01); *F16H 3/724* (2013.01); *F16H 37/0806* (2013.01); *B60W 2030/206* (2013.01); *B60W 2710/0666* (2013.01); *B60W 2710/083* (2013.01); *B60Y 2200/92* (2013.01); *B60Y 2300/20* (2013.01); *B60Y 2300/74* (2013.01); *B60Y 2306/09* (2013.01); *Y02T 10/6239* (2013.01); *Y02T 10/6286* (2013.01); *Y02T 10/7258* (2013.01); *Y10S 903/91* (2013.01); *Y10S 903/93* (2013.01)

(58) Field of Classification Search
None
See application file for complete search history.

(56) References Cited

U.S. PATENT DOCUMENTS

2016/0304084 A1\* 10/2016 Kawai .................. B60W 10/06

FOREIGN PATENT DOCUMENTS

| JP | 2008-201351 A | 9/2008 |
|---|---|---|
| JP | 2010-023790 A | 2/2010 |

(Continued)

*Primary Examiner* — Mussa A Shaawat
*Assistant Examiner* — Michael V Kerrigan
(74) *Attorney, Agent, or Firm* — Hunton Andrews Kurth LLP

(57) ABSTRACT

The control apparatus executes a pulsation compensating control where pulsation compensating torque is calculated for suppressing torque pulsation of an internal combustion engine by a pulsation-compensating-torque calculating portion and an MG1 controlling portion controls a first motor generator to output the pulsation compensating torque, while executes a pressing control where pressing torque is calculated for preventing torque of a second motor generator from crossing 0 Nm by a pressing-torque calculating portion and an MG2 controlling portion controls the second motor generator to output the pressing torque.

5 Claims, 14 Drawing Sheets

(51) Int. Cl.
    *B60W 20/20*     (2016.01)
    *B60W 20/30*     (2016.01)
    *B60W 30/20*     (2006.01)
    *F16H 3/72*      (2006.01)
    *F16H 37/08*     (2006.01)
    *B60K 6/445*     (2007.10)
    *B60W 20/15*     (2016.01)

(56) References Cited

FOREIGN PATENT DOCUMENTS

| | | |
|---|---|---|
| JP | 2012-126177 A | 7/2012 |
| JP | 2012-136047 A | 7/2012 |
| JP | 2012-148645 A | 8/2012 |
| JP | 2013086600 A | 5/2013 |
| JP | 2015104942 A | 6/2015 |
| WO | 2015079298 A1 | 6/2015 |
| WO | 2015087132 A1 | 6/2015 |

* cited by examiner

CONTROL APPARATUS FOR HYBRID VEHICLE

CROSS-REFERENCE TO RELATED APPLICATION

The present application claims priority to Japanese Patent Application No. 2016-005231 filed on Jan. 14, 2016, which is incorporated herein by reference in its entirety.

TECHNICAL FIELD

The present invention relates to a control apparatus which is applied to a hybrid vehicle having an internal combustion engine and two electric motors.

BACKGROUND ART

As problematic noises of a hybrid vehicle where two electric motors are provided via a backlash on a power transmission path extending from an internal combustion engine to drive wheels, there are known to be booming noise which occurs by vibration of the power transmission path, the vibration being excited by torque pulsation of the internal combustion engine, and rattling noise which occurs by collision of gears at the backlash when motor torque crosses 0 Nm. Although the backlash generally indicates a gap between gears engaging with each other, here, a gap existing in a rotational direction of two members locked by spline-coupling or the like so as to be twisted to each other is also treated as the backlash. Accordingly, noise which occurs by collision of such two members at the backlash during their rotation is also one kind of the rattling noise.

There is known to be a control apparatus for suppressing the booming noise, where a torque pulsation component is calculated from torque of a crank shaft of an internal combustion engine, a pulsation compensating torque for removing the torque pulsation component from torque of a drive shaft is calculated based on the toque pulsation component calculated and a torque transmission function from the internal combustion engine to the drive shaft, and the pulsation compensating torque calculated is subtracted from a torque command value of a second electric motor, thereby the torque command value is corrected (the patent literature #1). Further, there is known to be a control apparatus for suppressing the rattling noise, which executes a pressing control where the second electric motor is made to output pressing torque for preventing motor torque of the second electric motor from reaching 0 Nm, and a gear train and the like connected to the second electric motor are held in a state that they are pressed in one direction (the patent literature #2).

CITATION LIST

Patent Literature

Patent literature #1: JP2010-23790A.
Patent literature #2: JP2012-148645A

SUMMARY OF INVENTION

Technical Problem

As mentioned above, the method for suppressing the booming noise and the method for suppressing the rattling noise are known independently of each other. However, conventionally, there is no conception that both of the booming noise and the rattling noise are suppressed at the same time on the assumption that the noises occur at the same time. If both of the booming noise and the rattling noise are suppressed using a single electric motor in reference to each of the above literatures, the following problems could occur. The pressing torque for suppressing the rattling noise should have an upper limit in order to avoid acceleration and deceleration not intended by a user. Due to this, the amplitude of the pulsation compensating torque for suppressing the booming noise could exceed the upper limit of the pressing torque and the motor torque could cross 0 Nm. In such a case, it is possible to suppress the booming noise, but the rattling noise occurs. On the other hand, if the amplitude of the pulsation compensating torque is restricted so as not to exceed the upper limit of the pressing torque in order to avoid the occurrence of the rattling noise, it is possible to suppress the rattling noise, but the booming noise is not suppressed sufficiently because of lack of the pulsation compensating torque.

As such, the present invention aims to provide a control apparatus for a hybrid vehicle capable of suppressing both of the booming noise and the rattling noise at the same time.

Solution to Problem

A control apparatus as one aspect of the present invention is a control apparatus for a hybrid vehicle, the hybrid vehicle having a first electric motor and a second electric motor on a power transmission path for transmitting output of an internal combustion engine to drive wheels, the second electric motor being connected to the power transmission path via a backlash, wherein the control apparatus is configured as a computer, and by executing a computer program, configured to execute: a pulsation compensating control which makes the first electric motor output pulsation compensating torque for suppressing torque pulsation of the internal combustion engine; and a pressing control which makes the second electric motor output pressing torque for preventing from crossing 0 Nm, motor torque of the second electric motor transmitted to the power transmission path.

According to the above control apparatus, the first electric motor is controlled to take charge of execution of the pulsation compensating control for suppressing the booming noise, while the second electric motor is controlled to take charge of execution of the pressing control for suppressing the rattling noise. Accordingly, it is not necessary to make a single electric motor output pulsation compensating torque and pressing torque. Due to this, when the pulsation compensating control is executed by the first electric motor, it is not necessary to add the pressing torque to the pulsation compensating torque and thereby the amplitude of the pulsation compensating torque can lower by an amount of the amplitude of the pressing torque. On the other hand, it is possible to make the second electric motor output the pressing torque. Thereby, since it is possible to avoid a problem that only any one of the booming noise and the rattling noise is suppressed and the other one cannot be suppressed, it is possible to suppress the booming noise and the rattling noise at the same time.

In one embodiment of the control apparatus of the present invention, the first electric motor may be connected to the power transmission path via a backlash, and the control apparatus may be configured to restrict the pulsation compensating torque so that motor torque of the first electric motor is prevented from crossing 0 Nm in the pulsation compensating control. According to this embodiment, since it is possible to prevent the motor torque of the first electric motor from crossing 0 Nm in the pulsation compensating control, it is possible to suppress the occurrence of rattling noise caused by the backlash between the first electric motor and the power transmission path.

In the above embodiment, the control apparatus may be configured to execute, as well as the pulsation compensating control and the pressing control, an aid control which makes the second electric motor output aid torque for covering shortfall of the pulsation compensating torque, in a case where the torque pulsation of the internal combustion engine is insufficiently suppressed because of restriction of the pulsation compensating torque, and configured to restrict the aid torque so that the motor torque of the second electric motor is prevented from crossing 0 Nm in the aid control. In this case, even if the torque pulsation is suppressed insufficiently because of the restriction of the pulsation compensating torque, it is possible to cover the shortfall by the aid control which makes the second electric motor output the aid torque. Thereby, it is possible to suppress the booming noise. Additionally, since the motor torque of the second electric motor can be prevented from crossing 0 Nm even if the aid control is executed, it is also possible to suppress the rattling noise.

Further, in the above embodiment, the power transmission path may be provided with a power dividing mechanism which is configured as a single-pinion type planet gear mechanism including a sun gear being connected to the first electric motor; a planet gear being connected to the internal combustion engine; and a ring gear being connected to an output portion for transmitting torque to the drive wheels, and the control apparatus may be configured to deform a negative side of a torque form to 0 Nm, the torque form being a basis of the pulsation compensating torque, and offset the torque form deformed to make an average of the deformed torque form 0 Nm, so that the motor torque of the first electric motor does not exceed a rating torque in the pulsation compensating control. Since such a power dividing mechanism is provided on the power transmission path, when the internal combustion engine rotates in a positive direction and also the output portion rotates in a positive direction, the first electric motor rotates in a negative direction with receiving the reaction torque of the internal combustion engine, and is operated as an electric generator. Accordingly, in a case where the motor torque of the first electric motor exceeds the rating torque in the negative side earlier than in the positive side. Therefore, by deforming the negative side of the torque form to 0 Nm, and also offsetting the deformed torque form so that the average of the deformed torque form becomes 0 Nm, it is possible to observe the rating torque of the first electric motor on both of the positive and negative sides.

In one embodiment of the control apparatus of the present invention, the control apparatus may be configured to execute the pressing control as well as the pulsation compensating control, in a case where a required operation point defined by engine speed and engine torque of the internal combustion engine belongs to a noisy area set as an operation area where a noise occurs, the noise being caused by the torque pulsation of the internal combustion engine. According to this embodiment, in a case that the required operation point belongs to the operation area where the noise caused by the torque pulsation, that is, the booming noise, could occur, it is possible to execute both of the pulsation compensating control and the pressing control.

In the present invention, a conception that torque pulsation is suppressed includes not only a case that the torque pulsation is suppressed completely, but also a case that the amplitude of the torque pulsation is lowered. Further, a case that torque crosses 0 Nm means that a direction of torque inverts, the direction including both directions, from the positive side to the negative side and from the negative side to the positive side.

DESCRIPTION OF EMBODIMENTS

First Embodiment

Figure 1:
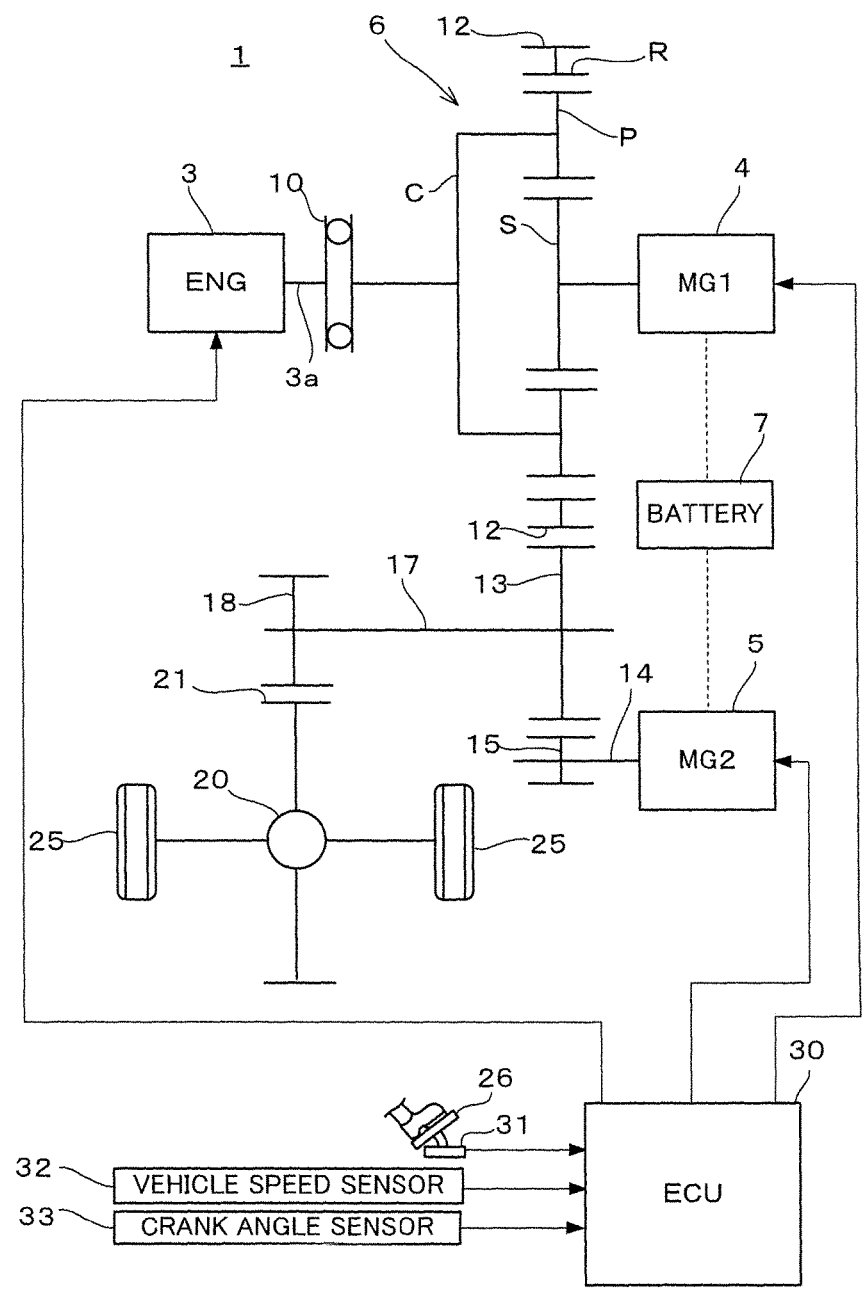
FIG. 1 is a diagram showing an entire configuration of a hybrid vehicle where a control apparatus according to one embodiment of the present invention is applied.

As shown in FIG. 1, a vehicle 1 is configured as a hybrid vehicle where a plurality of power sources are combined. The vehicle 1 comprises an internal combustion engine 3, and two motor generators 4 and 5 as power sources for travelling. The internal combustion engine 3 is configured as, for example, a spark-ignition reciprocal internal combustion engine having three cylinders (not illustrated). The internal combustion engine 3 is operated at a predetermined target air-fuel ratio (for example, a theoretical air-fuel ratio).

The internal combustion engine 3 and the first motor generator 4 are connected to a power dividing mechanism 6. The first motor generator 4 functions as an electric generator which generates electricity by receiving power of the internal combustion engine 3 having been divided at the power dividing mechanism 6, and also functions as an electric motor which is driven by alternating-current power. As with the first motor generator 4, the second motor generator 5 functions as each of the electric motor and the electric generator. The first motor generator 4 corresponds to a first electric motor of the present invention, and the second motor generator 5 corresponds to a second electric motor of the present invention. Each of the first and second motor generators 4 and 5 is electrically connected to a battery 7. In the specification and in the drawings, the representation "MG1" indicates the first motor generator 4, and the representation "MG2" indicates the second motor generator 5.

The power dividing mechanism 6 is configured as a single pinion type planetary gear mechanism, and has a sun gear S which is an external gear, a ring gear R which is an internal gear arranged coaxially with the sun gear S, and a planet career C holding a pinion P in a rotatable and also revolvable manner, the pinion P engaging with the gears S and R. Engine torque output from the internal combustion engine 3 is transmitted to the planet career C of the power dividing mechanism 6 via a torsional damper 10. A crank shaft 3a of the internal combustion engine 3 is connected to an input side of the torsional damper 10, and the planet career C is connected to an output side of the torsional damper 10. The first motor generator 4 is connected to the sun gear S of the power dividing mechanism 6.

The outer circumference of the ring gear R of the power dividing mechanism 6 is provided with an output gear 12 which is an external gear. The output gear 12 engages with a driven gear 13. A motor shaft 14 of the second motor generator 5 is provided with a motor gear 15 engaging with the driven gear 13. The driven gear 13 is fixed to a counter shaft 17, and to the counter shaft 17 a drive gear 18 is fixed. The drive gear 18 engages with a ring gear 21 of a differential mechanism 20. Accordingly, torque outputted from the output gear 12 and motor torque of the second motor generator 5 are transmitted to the differential mechanism 20 via the driven gear 13 and the drive gear 18. The torque transmitted to the differential mechanism 20 is divided into right and left drive wheels 25.

In this way, the power transmission path for transmitting the output of the internal combustion engine 3 to the drive wheels 25 is organized by the power dividing mechanism 6, the output gear 12, the driven gear 13, the drive gear 18, and the differential mechanism 20. Such a power transmission path is provided with two motor generators 4 and 5. The torques of the first motor generator 4 and the second motor generator 5 are inputted to the power transmission path via the sun gear S and the motor gear 15 respectively. Thereby, each of the first motor generator 4 and the second motor generator 5 is connected to the power transmission path via the backlash.

As is apparent from the configuration of the vehicle 1, it is possible to change an operation point of the internal combustion engine 3 defined by engine speed and engine torque of the internal combustion engine 3 in a state that the vehicle speed is maintained, by controlling motor torque and motor speed of the first motor generator 4 connected to the power dividing mechanism 6.

Each portion of the vehicle 1 is controlled by an electronic control unit (ECU) 30 configured as a computer. The ECU 30 executes various kinds of control to the internal combustion engine 3 and the motor generators 4 and 5. Various kinds of information of the vehicle 1 are inputted to the ECU 30. For example, inputted to the ECU 30 are an output signal of an accelerator position sensor 31 which outputs a signal according to the amount that an accelerator pedal 26 has been pushed, an output signal of a vehicle speed sensor 32 which outputs a signal according to vehicle speed of the vehicle 1, an output signal of a crank angle sensor 33 which outputs a signal according to a crank angle of the internal combustion engine 3, and the like.

The ECU 30 calculates a required output which is required by a driver by referring to the output signal of the accelerator position sensor 31 and the output signal of the vehicle speed sensor 32, and controls the vehicle 1 while changing various kinds of modes so that the system efficiency to the required output becomes optimum. For example, in a low load area where thermal efficiency of the internal combustion engine 3 lowers, combustion of the internal combustion engine 3 is stopped and an EV mode where the second motor generator 5 is driven is selected. Further, in a case that torque only from the internal combustion engine 3 is insufficient, or in a case that battery charge of the battery 7 is insufficient, a hybrid mode is selected, where the internal combustion engine 3 or the second motor generator 7 with the internal combustion engine 3 is used as the power source for traveling. In a case that an operating condition changes while the vehicle is traveling, the ECU 30 stops the combustion of the internal combustion engine 3 to move into the EV mode from the hybrid mode, or starts up the internal combustion engine 3 to move into the hybrid mode from the EV mode.

Figure 2:
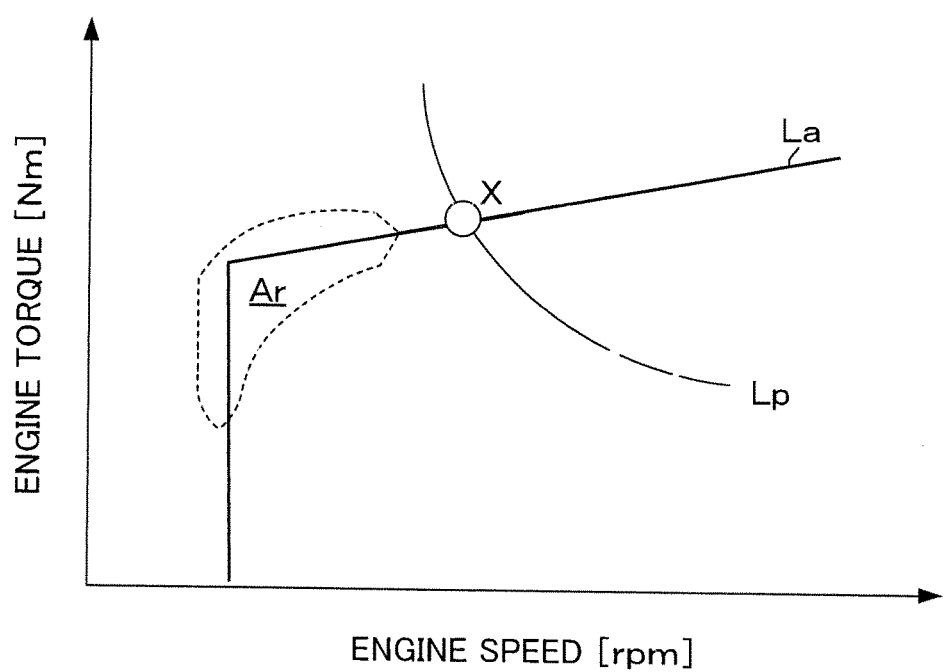
FIG. 2 is a diagram showing a relation between an operation point of an internal combustion engine and a noise area.

In a case that the vehicle 1 is traveling in the hybrid mode, the ECU 30 moves the operation point of the internal combustion engine 3 so that the thermal efficiency of the internal combustion engine 3 keeps as high as possible. For example, as shown in FIG. 2, a fuel consumption line La obtained by connecting operation points where the thermal efficiency of the internal combustion engine 3 is good, is set experimentally, and then, an intersection of the fuel consumption line La and an equal power line Lp determined based on the required output is determined as the operation point X of the internal combustion engine 3. Thereby, the ECU 30 moves the operation point of the internal combustion engine 3 along the fuel consumption line La.

In a case that the engine torque alone is insufficient to cover the required torque to the vehicle 1 traveling in the hybrid mode, shortfall of the required torque is covered by the motor torque of the second motor generator 5. In a case that almost all required torque can be covered by the engine torque of the internal combustion engine 3, the motor torque of the second motor generator 5 takes a small value around 0 Nm, and could crosses 0 Nm. In such a case, the rattling noise occurs at the backlash by collision of the motor gear 15 and the driven gear 13 which engage with each other. Also, with respect to the first motor generator 4 connected to the power transmission path via the backlash, the rattling noise could occur by the motor torque of the first motor generator 4 crossing 0 Nm.

Further, because of output characteristics of the internal combustion engine 3, the torque pulsation that engine torque fluctuates in a cyclic manner exists. The torque pulsation excites vibration of each component of the power transmission path. Thereby, the booming noise occurs. The booming noise occurs at a particular band of frequencies of the torque pulsation. The loudness of the booming noise correlates with the amplitude of the torque pulsation. Accordingly, it is possible to specify an operation area of the internal combustion engine 3 where the booming noise the loudness of which is problematic occurs. For example, as shown in FIG. 2, in a case that such an operation area is defined as a noisy area Ar, it is possible to determine whether the problematic booming noise would occur or not by determining whether the operation point X of the internal combustion engine 3 belongs to the noisy area Ar.

Figure 3:
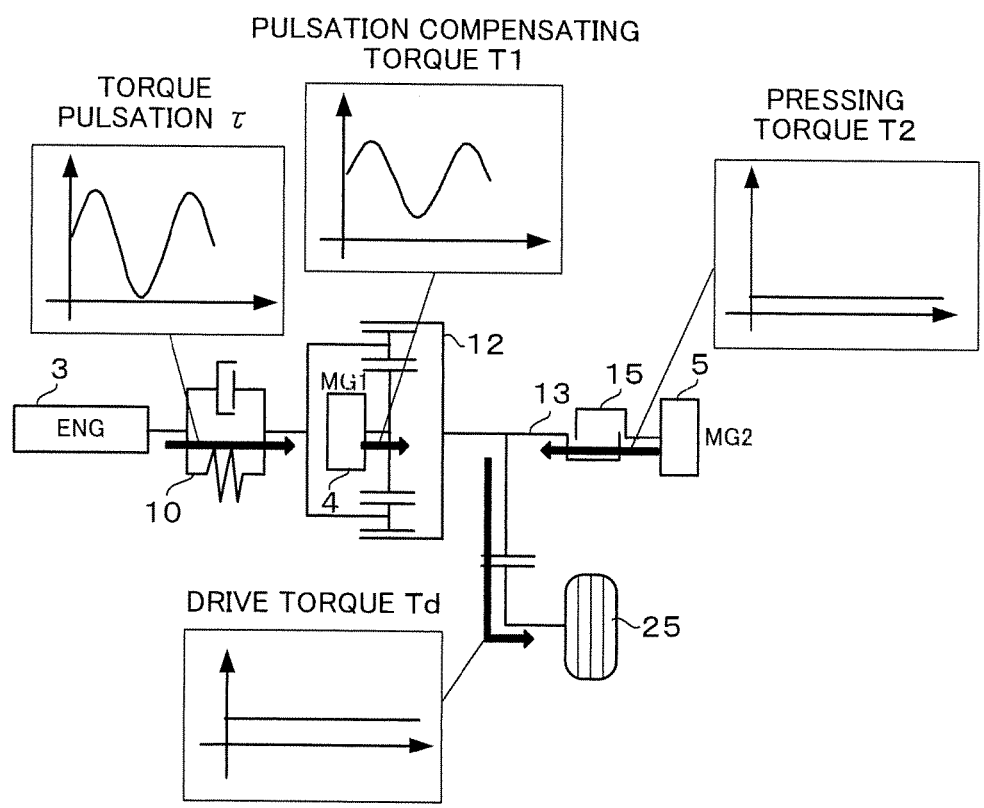
FIG. 3 is a conception diagram showing each control processing of a pulsation compensating control and a pressing control.

The present embodiment has features in control for suppressing both of the rattling noise and the booming noise. Hereinafter, in reference to FIGS. 3 to 9, control to be executed by the ECU 30 will be described. As shown in FIG. 3, in the control of the present embodiment, executed is a pulsation compensating control where the first motor generator 4 is controlled to output pulsation compensating torque T1 for suppressing the torque pulsation of the internal combustion engine 3 which causes the booming noise, as well as a pressing control where the second motor generator 5 is controlled to output pressing torque T2 for preventing the torque of the second motor generator 5 from crossing 0 Nm, which causes the rattling noise. In FIG. 3, the abscissa axis for each torque is a time axis.

The pulsation compensating torque T1 has a waveform the phase of which is almost same as a waveform of the torque pulsation T. The first motor generator 4 receives reaction torque of the engine torque of the internal combustion engine 3 by the power dividing mechanism 6. Due to this, by output of the pulsation compensating torque T1 having such a waveform from the first motor generator 4, it is possible to suppress the torque pulsation T. Thereby, it is possible to suppress the booming noise which is caused by the torque pulsation of the internal combustion engine 3. On the other hand, the pressing torque T2 is almost stationary, and by making the second motor generator 5 output the pressing torque T2, the motor gear 15 is kept in a state of pressing the driven gear 13. Accordingly, it is possible to prevent the motor torque of the second motor generator 5 from crossing 0 Nm. Thereby, it is possible to suppress the rattling noise which is caused by the second motor generator 5.

Torque is outputted to the driven gear 13 via the output gear 12 in a state the torque pulsation τ has been suppressed by the pulsation compensating control. On the other hand, by the pressing control, from the second motor generator 5, the pressing torque T2, which is almost stationary, is outputted to the driven gear 13. Thereby, the drive torque Td which is transmitted to the drive wheels 25 via the driven gear 13 becomes almost stationary. By the pressing control, the second motor generator 5 and the driven gear 13 are directly connected to each other. Then, when the engine torque is transmitted to the driven gear 13, inertia of the second motor generator 5 is given to the driven gear 13. From the effect thereof, transmission sensitivity of the torque pulsation from the internal combustion engine 3 side to the driven gear 13 decreases. Thereby, it is possible to suppress occurrence of the booming noise at the driven gear 13 and the periphery thereof. Further, as a result of the fact that the torque pulsation τ is suppressed by the pulsation compensating torque T1, the members such as gears are prevented from colliding against each other at the backlash in the power dividing mechanism 6. Therefore, it is possible to suppress the occurrence of the rattling noise in the power dividing mechanism 6.

Figure 4:
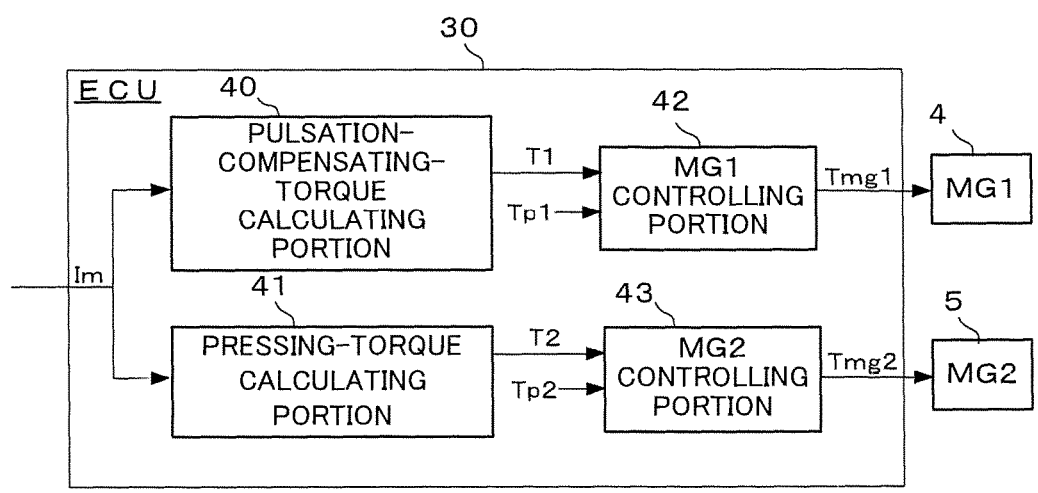
FIG. 4 is a block diagram showing summary of a control system.

As shown in FIG. 4, a plurality of functional portions are logically configured in the ECU 30. The pulsation compensating control and pressing control above mentioned are executed by the functional portions. The ECU 30 has a pulsation-compensating-torque calculating portion 40 which calculates the pulsation compensating torque T1 and a pressing-torque calculating portion 41 which calculates the pressing torque T2. Various kinds of information Im are inputted to each of the pulsation-compensating-torque calculating portion 40 and the pressing-torque calculating portion 41. The various kinds of information Im include external information such as the output signals of the sensors 31 to 33 shown in FIG. 1 and internal information such as predetermined parameter values held by the ECU 30. Based on such various kinds of information Im, the pulsation-compensating-torque calculating portion 40 calculates the pulsation compensating torque T1, and the pressing-torque calculating portion 41 calculates the pressing torque T2.

The pulsation compensating torque T1 calculated by the pulsation-compensating-torque calculating portion 40 is transmitted to an MG1 controlling portion 42. The MG1 controlling portion 42 calculates a first-motor-torque command value Tmg1 by adding the pulsation compensating torque T1 to travel torque Tp1 required for travel of the vehicle 1, and controls the first motor generator 4 to output motor torque corresponding to the first-motor-torque command value Tmg1. The travel torque Tp1 is calculated as appropriate in consideration of various conditions such as the operation point of the internal combustion engine 3 and the state of charge of the battery 7. On the other hand, the pressing torque T2 calculated by the pressing-torque calculating portion 41 is transmitted to an MG2 controlling portion 43. The MG2 controlling portion 43 calculates a second-motor-torque command value Tmg2 by adding the pressing torque T2 to travel torque Tp2 required for travel of the vehicle 1, and controls the second motor generator 5 to output motor torque corresponding to the second-motor-torque command value Tmg2. The travel torque Tp2 is calculated in the same way as the travel torque Tp1. The pressing-torque calculating portion 41 is capable of calculating the pressing torque T2 having a fixed value by reading the internal information held by the ECU 30, and also capable of calculating the pressing torque T2 appropriate for a drive state of the vehicle 1 by publically-known logic based on the various kinds of information Im.

Figure 5:
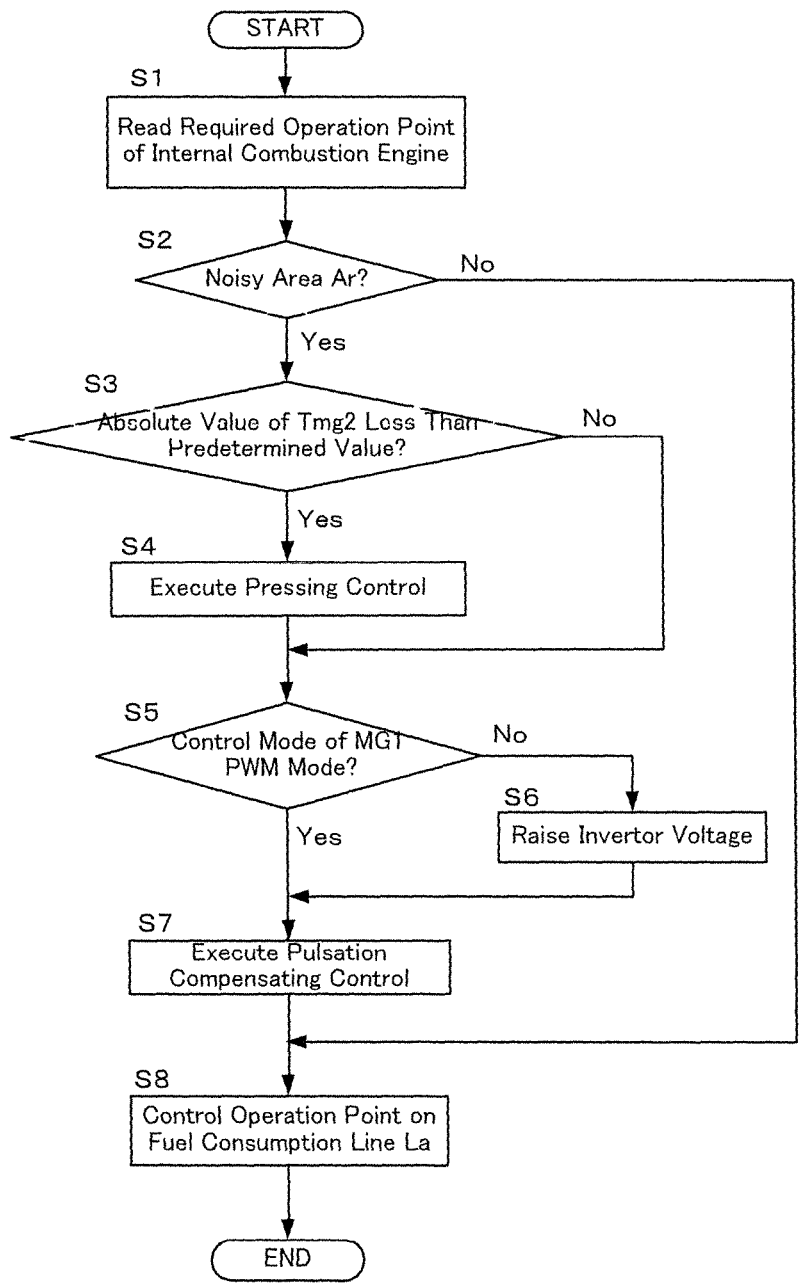
FIG. 5 is a flow chart showing one example of a control routine according to one embodiment of the present invention.

The procedure executed by the ECU 30 in order to execute the pulsation compensating control and pressing control will be described in reference to a flowchart shown in FIG. 5. A computer program for a control routine shown in FIG. 5 is held by the ECU 30. The computer program is read out as necessary and executed repeatedly at predetermined intervals.

At step S1, the ECU 30 reads the required operation point of the internal combustion engine 3. The required operation point is calculated based on information such as the accelerator position and the vehicle speed by a control routine executed in parallel with the control routine of FIG. 5. At step S2, the ECU 30 determines whether the required operation point belongs to the noisy area Ar (see FIG. 2). In a case that the required operation point does, since the booming noise would occur, steps S3 to S7 are executed. In a case that the required operation point does not, the ECU 30 skips steps S3 to S7 and goes to step S8 to control the operation point of the internal combustion engine 3 on the fuel consumption line La (see FIG. 2).

At step S3, the ECU 30 determines whether an absolute value of the second-motor-torque command value Tmg2 of the second motor generator 5 is less than a predetermined value. The predetermined value is set around 0 Nm based on a possibility that the motor torque of the second motor generator 5 crosses 0 Nm. In a case that the absolute value is less than the predetermined value, the motor torque of the second motor generator 5 would cross 0 Nm and make the rattling noise. Therefore, the ECU 30 goes to step S4 to execute the pressing control above mentioned. On the other hand, in a case that the absolute value is equal to or more than the predetermined value, since there is no possibility that the motor torque of the second motor generator 5 crosses 0 Nm, the ECU 30 skips step S4 and then goes to step S5.

At step S5, the ECU 30 determines whether or not the control mode of the first motor generator 4 is a PWM mode. The control mode of the first motor generator 4 is switched by an inverter not illustrated. In a case that the inverter is in a PWM-waveform-voltage drive, the control mode of the first motor generator 4 is the PWM mode, and in a case that the inverter is in a rectangular-waveform-voltage drive, the control mode is a rectangular waveform control mode. In the present embodiment, when the pulsation compensating control is executed, the first motor generator 4 is in the PWM mode. Accordingly, when the control mode of the first motor generator 4 is not the PWM mode, the ECU 30 goes to step S6 to raise inverter voltage and switch the control mode to the PWM mode.

At step S7, the ECU 30 executes the pulsation compensating control above mentioned, and at the next step S8, the ECU 30 controls the operation point of the internal combustion engine 3 on the fuel consumption line La. And, the ECU 30 ends the routine of this time.

The control routine of FIG. 5 is executed by the ECU 30, thereby, in a case that the required operation point of the internal combustion engine 3 belongs to the noisy area Ar, the pressing control is executed as well as the pulsation compensating control. Accordingly, it is possible to suppress both of the booming noise and the rattling noise.

Next, for calculating the pulsation compensating torque T1, a method which the pulsation-compensating-torque calculating portion 40 shown in FIG. 4 can execute will be described in reference to FIGS. 6 to 9. As the method of calculating the pulsation compensating torque T1, any one of the following methods of calculating can be employed.

Figure 6:
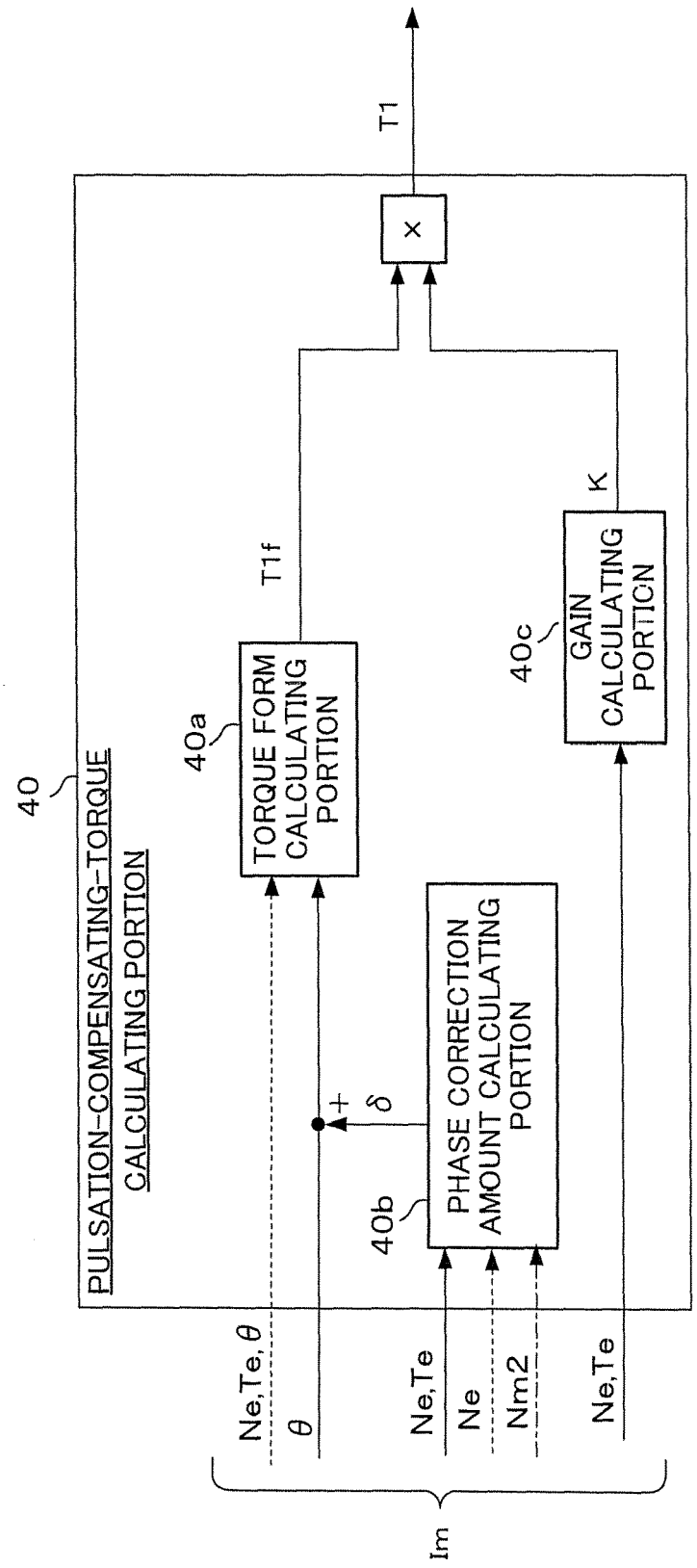
FIG. 6 is a block diagram showing a configuration of a pulsation compensating torque calculating portion according to a second embodiment.

The pulsation-compensating-torque calculating portion 40 is segmentalized into functional portions 40a to 40c shown in FIG. 6. The torque form calculating portion 40a calculates a torque form T1f which is a basis of the pulsation compensating torque T1, based on the various kinds of information Im inputted. The torque form T1f is a function of a crank angle of the internal combustion engine 3 and is equivalent to a waveform of the torque pulsation. A phase correction amount calculating portion 40b calculates a phase correction amount δ for correcting a crank angle θ of the internal combustion engine 3. Accordingly, the crank angle θ after the correction, that is, the crank angle θ to which the phase correction amount δ has been added, is inputted to the torque form calculating portion 40a. A gain calculating portion 40c calculates compensation gain K based on various kinds of information Im. The pulsation-compensating-torque calculating portion 40 calculates the pulsation compensating torque T1 by multiplying the calculated torque form T1f by the calculated compensation gain K.

<Calculation of Torque Form>

The two methods shown as follows are concrete examples of the method which is executed by the torque form calculating portion 40a for calculating the torque form T1f.

(Method #1)

Figure 7A:
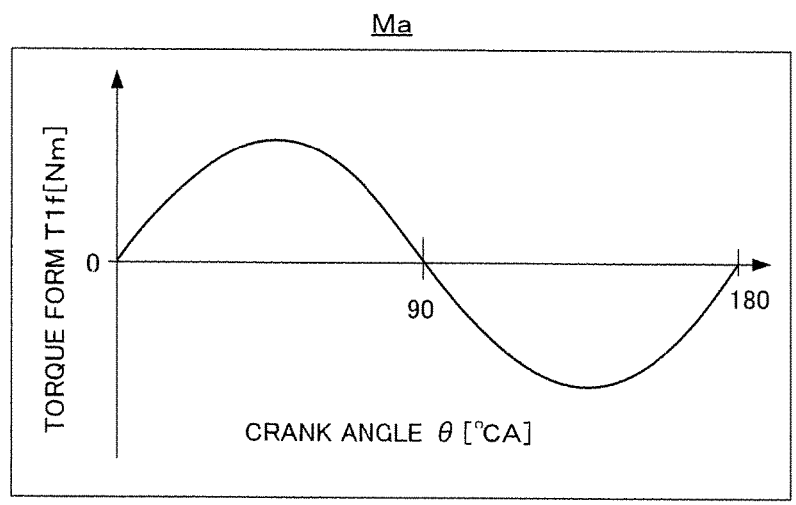
FIG. 7A is a diagram showing one example of a calculation map for calculation of a torque form.

The torque form calculating portion 40a calculates the torque form T1f by using a calculation map Ma, which is shown in FIG. 7A, stored in advance. The calculation map Ma has a data structure which gives the torque form T1f by using a crank angle θ of the internal combustion engine 3 as a variable number. The calculation map Ma is made by measuring the torque pulsation of the internal combustion engine 3 in advance. Since the toque pulsation varies depending on the operation point of the internal combustion engine 3, the calculation map Ma is made by averaging of torque pulsations each corresponding to each operation point. The torque form calculating portion 40a reads a crank angle θ of the internal combustion engine 3, and by using the calculation map Ma, specifies and calculates the torque form T1f corresponding to the crank angle θ read.

(Method #2)

Figure 7B:
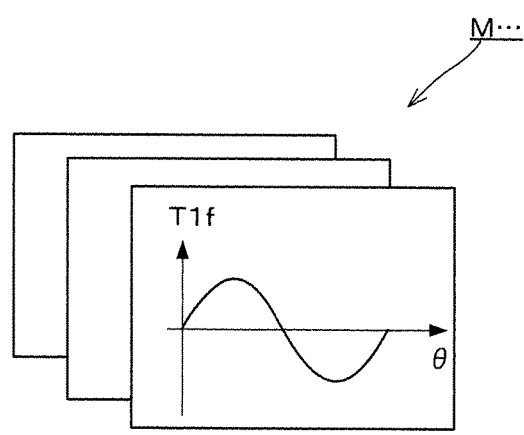
FIG. 7B is a diagram showing an image of a plurality of calculation maps prepared.

In consideration of a fact that the torque pulsation varies depending on an operation point of the internal combustion engine 3, a plurality of calculation maps M . . . , as shown in FIG. 7B, have been prepared. Each of the calculation maps M is similar to the calculation map Ma and has been prepared for each appropriate operation area. The torque form calculating portion 40a calculates the torque form T1f by switching depending on the operation point of the internal combustion engine 3, the calculation map to be used. The torque from calculating portion 40a reads the operation point (the engine speed Ne and engine torque Te) of the internal combustion engine 3 and the crank angle θ as shown by a broken line in FIG. 6, selects the calculation map corresponding to the operation point read, and by using the calculation map selected, specifies and calculates the torque form T1f corresponding to the crank angle θ read.

<Calculation of Phase Correction Amount>

The three methods shown as follows are concrete examples of the method of calculating the phase correction amount δ executed by the phase correction amount calculating portion 40b.

(Method #1)

Figure 8:
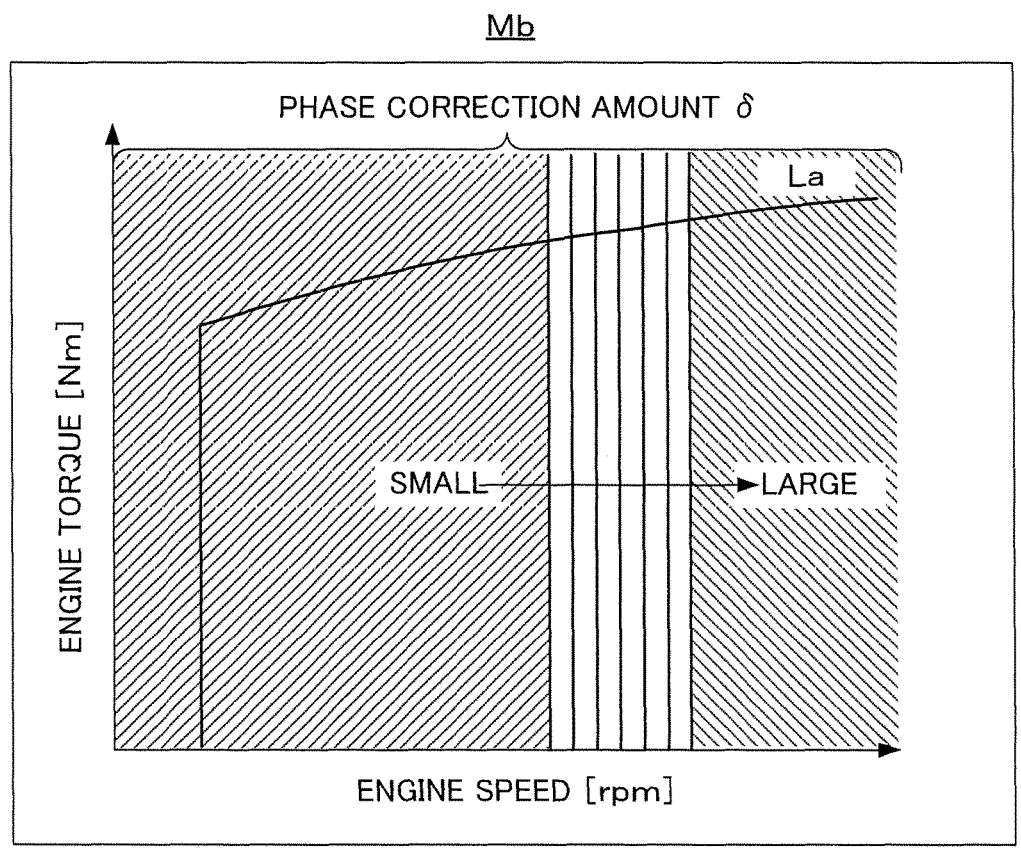
FIG. 8 is a diagram showing one example of the calculation map for calculation of a phase compensation amount.

The phase correction amount calculating portion 40b calculates the phase correction amount δ by using a calculation map Mb, as shown in FIG. 8, stored in advance. In the calculation map Mb, the optimum phase correction amount δ is assigned to an operation area where the abscissa axis is set for engine speed and the vertical axis is set for engine torque, and the phase correction amount δ is set so as to get larger as the engine speed gets higher. In FIG. 8, each of plural straight lines parallel with the vertical axis indicates a border of a region where the phase correction amount δ is the same value. The optimum phase correction amount δ is investigated by using an actual equipment in advance, and the calculation map Mb is made based on the investigation result. The phase correction amount calculating portion 40b reads the operation point (the engine speed Ne and engine torque Te) of the internal combustion engine 3, and by using the calculation map Mb, specifies and calculates the phase correction amount δ corresponding to the operation point.

(Method #2)

The phase correction amount calculating portion 40b reads engine speed Ne shown by a broken line as various kinds of information Im, and calculates the phase correction amount δ in an on-board manner based on the following formula.

$$\delta = \delta p - \delta a - \delta b \qquad 1$$

δp is a phase where the pulsation torque becomes a peak. δp is specified by actual measurement and stored as the various kinds of information Im in advance. δa is a phase which progresses during delay time from a moment the torque command value is given to the first motor generator 4 until a moment the command value becomes realized. The phase which progresses during the delay time is calculated based on the engine speed Ne. δb is a phase which, in a case smoothing process is executed for slowing the upstroke of motor torque of the first motor generator 4, progresses during delay time occurring because of the smoothing process until the final command. The phase progressing during the delay time is calculated based on the engine speed Ne.

(Method #3)

The phase correction amount calculating portion 40b reads the motor speed Nm2 of the second motor generator 5 indicated by a dot-and-dash line as the various kinds of information Im, and searches the optimum phase correction amount δ in an on-board manner with a computer program for execution of the following proceeding.

(a) Determination timing is set for each constant time. The time is set to, for example, around 0.1 sec.

(b) With respect to a change amount ΔNm2 of motor speed Nm2 of the second motor generator 5, the change amount ΔNm2 of a case of the phase correction amount δn−1 calculated last time is compared with the change amount ΔNm2 of a case of the phase correction amount δn calculated this time.

(c) In a case that the change amount ΔNm2 obtained this time is smaller than the change amount ΔNm2 obtained last time, the phase correction amount δn of this time is increased by a predetermined amount. In a case that the change amount ΔNm2 obtained this time is larger than the change amount ΔNm2 obtained last time, the phase correction amount δn of this time is decreased by a predetermined amount. The phase correction amount δn is updated by being increased or decreased by the predetermined amount, as the phase correction amount δn+1 for the next time. Thereby, the phase correction amount δ is calculated by being converged on an optimum value. The predetermined amount is set as appropriate in consideration of convergence time Instead of the change amount ΔNm2, by using the magnitude To of the torque pulsation of the drive wheels 25 side, it is also possible to calculate the phase correction amount δ in the same way as the mentioned embodiment. In this case, for specifying the magnitude To of the torque pulsation, a torque sensor may be set, or the magnitude To may be calculated based on the motor speed Nm2 and motor torque of the second motor generator 5.

<Calculation of Compensation Gain>

Figure 9:
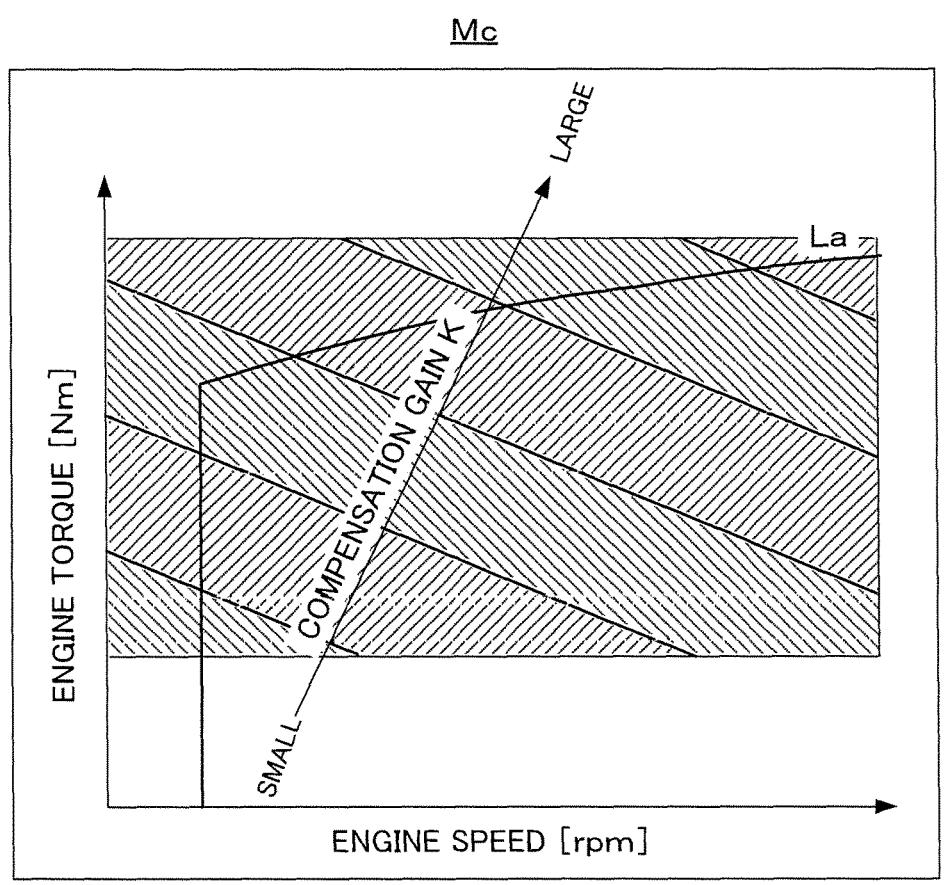
FIG. 9 is a diagram showing one example of the calculation map for calculation of compensation gain.

The gain calculating portion 40c calculates the compensation gain K using a calculation map Mc, shown in FIG. 9 for example, stored in advance. In the calculation map Mc, an optimum compensation gain K is assigned to an operation area where the abscissa axis is set for engine speed and the vertical axis is set for engine torque. The compensation gain K is set so as to get larger as the engine speed and engine torque get larger. The optimum compensation gain K is calculated based on the magnitude of the torque pulsation of the internal combustion engine 3 investigated with an actual equipment in advance. Based on the calculation result, the calculation map Mc is made. The phase correction amount calculating portion 40b reads the operation point (the engine speed Ne and engine torque Te) of the internal combustion engine 3, and by using the calculation map Mc, specifies and calculates the compensation gain K corresponding to the operation point read. In addition, the gain calculating portion 40c may restrict the compensation gain K so as not to exceed rating torque of the first motor generator 4.

According to the first embodiment, the first motor generator 4 is made to take charge of the pulsation compensating control for suppressing the booming noise, and the second motor generator 5 is made to take charge of the pressing control for suppressing the rattling noise. Accordingly, it is not necessary to output the pulsation compensating torque T1 and the pressing torque T2 from a single motor generator. Therefore, when the pulsation compensating control is executed with the first motor generator 4, it is possible to reduce the amplitude of the pulsation compensating torque T1 by the one of the pressing torque T2, because the pressing torque T2 is not added to the pulsation compensating torque T1. On the other hand, it is possible to output the pressing torque T2 from the second motor generator 5. Thereby, it is possible to avoid a state that any one of the booming noise and the rattling noise can be suppressed but the other one cannot be suppressed, and it is possible to suppress both of the booming noise and the rattling noise at the same time.

Second Embodiment

Next, a second embodiment of the present invention will be described in reference to FIG. 10. The second embodiment is the same as the first embodiment except for the processing for calculating the gain. The descriptions for matters common with the first embodiment will be omitted. In the second embodiment, when the pulsation compensating control is executed the compensation gain K is restricted so that the motor torque of the first motor generator 4 neither crosses 0 Nm nor exceeds the rating torque. Thereby, the pulsation compensating torque T1 is restricted.

Figure 10:
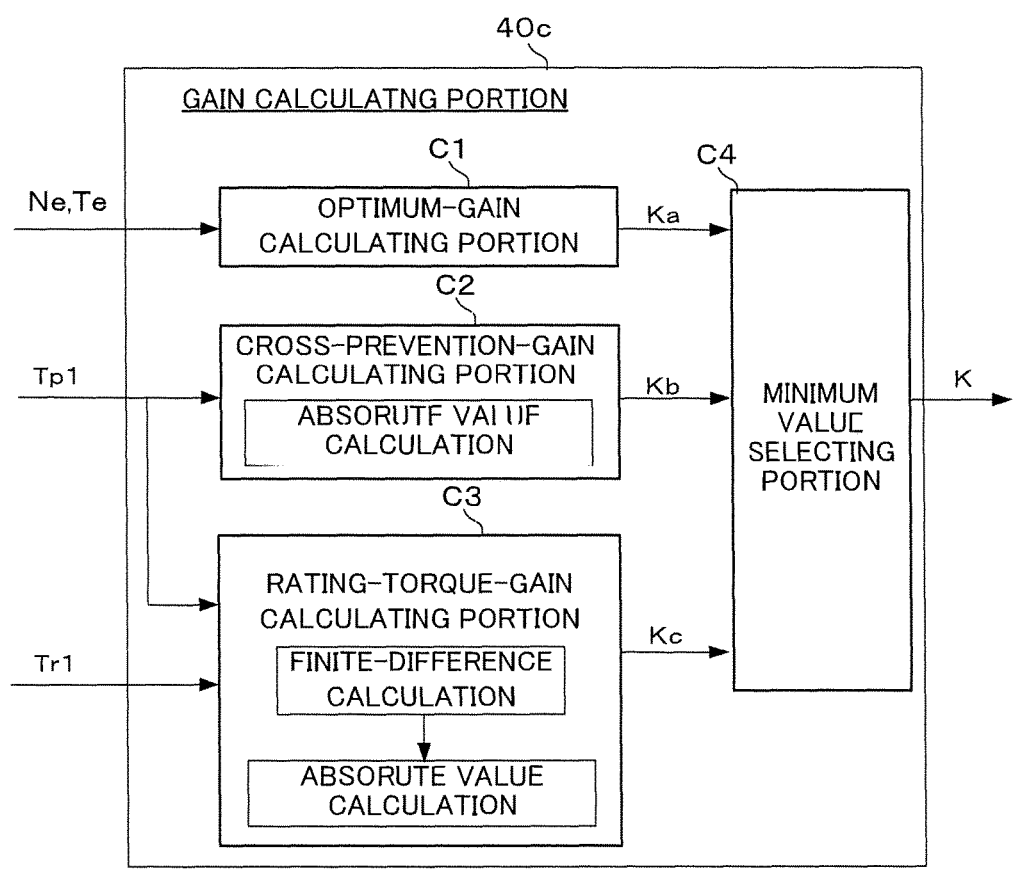
FIG. 10 is a block diagram showing a configuration of a gain calculating portion according to the second embodiment.

As shown in FIG. 10, in the second embodiment, the gain calculating portion 40c includes an optimum-gain calculating portion C1, a cross-prevention-gain calculating portion C2, a rating-torque-gain calculating portion C3, and a minimum value selecting portion C4. The optimum-gain calculating portion C1 calculates an optimum gain Ka which is ideal for compensating the torque pulsation. The cross-prevention-gain calculating portion C2 calculates a cross prevention gain Kb for preventing the motor torque of the first motor generator 4 from crossing 0 Nm. The rating-torque-gain calculating portion C3 calculates a rating torque gain Kc for preventing the motor torque from exceeding the rating torque of the first motor generator 4. The minimum value selecting portion C4 selects the minimum value out of the optimum gain Ka, the cross prevention gain Kb, and the rating torque gain Kc, and calculates the minimum value selected as the compensation gain K.

The engine speed Ne and engine torque Te of the internal combustion engine 3 are inputted to the optimum-gain calculating portion C1. The optimum-gain calculating portion C1 calculates the optimum gain Ka corresponding to the inputted engine speed Ne and engine torque Te, by using the calculation map Mc (FIG. 9) also used by the first embodiment, for example. That is, the optimum gain Ka can be calculated by a similar method to the compensation gain K calculated in the first embodiment.

With respect to the calculations of the cross prevention gain Kb and the rating torque gain Kc, premises thereof will be described. The first motor torque command value Tmg1 is obtained by adding the pulsation compensating torque T1 to the travel torque Tp1, and the pulsation compensating torque T1 is obtained by multiplying the torque form Tf1 by the compensation gain K. Therefore, the following formula 2 can be established. And then, when the formula 2 is solved with respect to the compensation gain K, the formula 3 is obtained from the formula 2.

$$Tmg1 = Tp1 + T1 = Tp1 + Tf1 \times K \qquad 2$$

$$K = (Tmg1 - Tp1)/Tf1 \qquad 3$$

A fact that the motor torque of the first motor generator 4 crosses 0 Nm in the pulsation compensating control means a fact that the first motor torque command value Tmg1 strides over 0 Nm and thereby the sign thereof inverts. Accordingly, if the compensation gain K is restricted so as to be less than or equal to a compensation gain K for making the first motor torque command value Tmg1 0 Nm, it is possible to prevent the motor torque from crossing 0 Nm.

Accordingly, the cross-prevention-gain calculating portion C2 sets Tmg1 of the right side of the formula 3 to 0, sets the values of the travel torque Tp1 and the torque form T1$f$ respectively, and obtains an absolute value of the calculation result. Thereby, the cross prevention gain Kb is calculated. The reason why an absolute value is obtained is because the gain is a scalar quantity having only magnitude.

On the other hand, the rating torque gain Kc is the compensation gain K for making the first motor torque command value Tmg1 less than or equal to the rating torque Tr1. Accordingly, the rating-torque-gain calculating portion C3 sets Tmg1 of the formula 3 to Tr1, sets the values of the travel torque Tp1 and the torque form T1$f$ respectively, and executes the finite-difference calculation (Tr1−Tp1)/T1$f$. And then, the rating-torque-gain-calculating portion C3 obtains an absolute value of the calculation result, and thereby calculates the rating torque gain Kc.

The minimum value selecting portion C4 selects the minimum value out of the optimum gain Ka, the cross prevention gain Kb, and the rating torque gain Kc, and calculates the minimum value as the compensation gain K. Consequently, according to the second embodiment, it is possible to execute the pulsation compensating control where the motor torque of the first motor generator 4 is prevented from crossing 0 Nm and also the motor torque does not exceed the rating torque.

Third Embodiment

Next, a third embodiment of the present invention will be described in reference to FIGS. 11 and 12. The third embodiment is the same as the second embodiment except for a method for restricting the pulsation compensating torque T1. Accordingly, hereinafter, the descriptions about processing and the like common with the second embodiment will be omitted, and with respect to the physical configuration and the like, the descriptions and drawings of the first embodiment should be referred as necessary.

In the third embodiment, the pulsation compensating torque T1 is restricted by the following way. In the pulsation compensating control, the torque form T1$f$ is deformed so that the motor torque of the first motor generator 4 does not exceed the rating torque thereof, and also the compensation gain K is restricted so that the motor torque is prevented from crossing 0 Nm.

Figure 11:
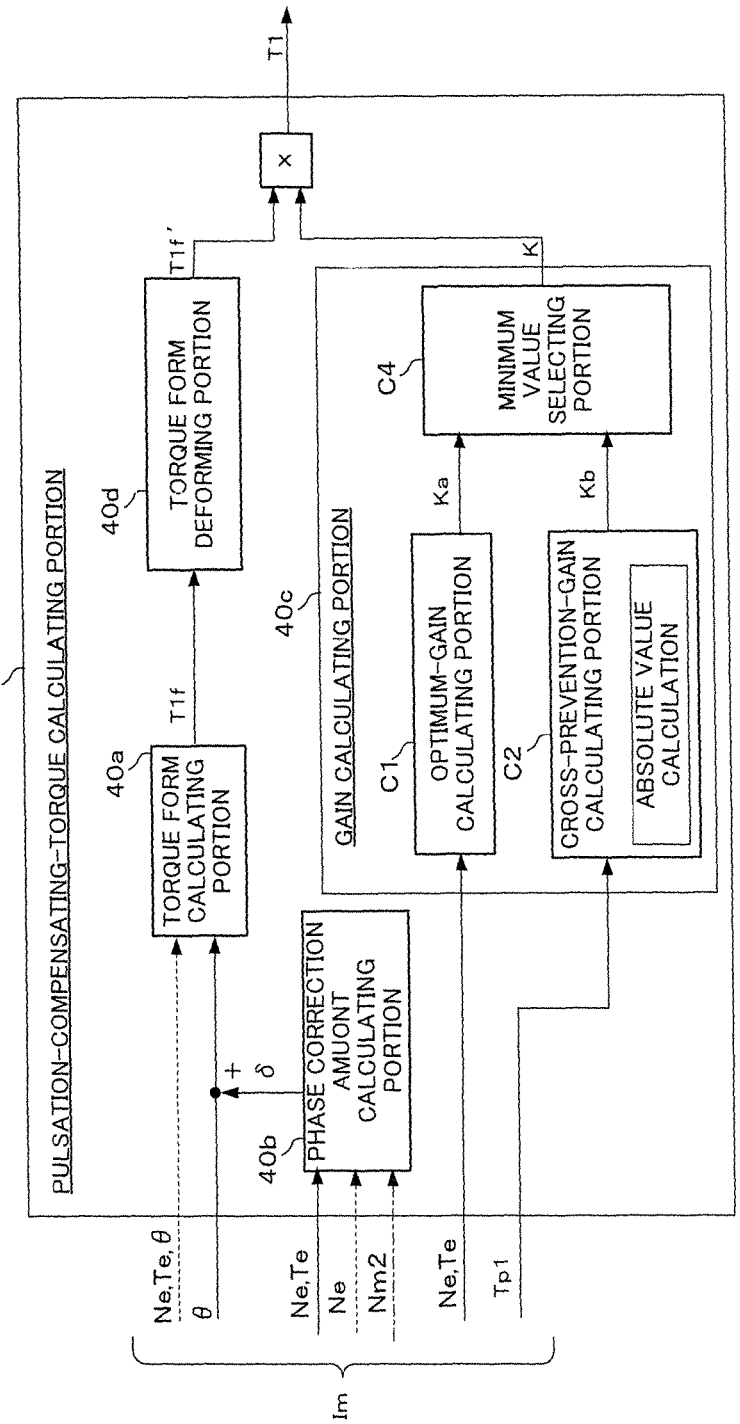
FIG. 11 is a block diagram showing a configuration of a pulsation-compensating-torque calculating portion according to a third embodiment.

As shown in FIG. 11, in the third embodiment, the pulsation-compensating-torque calculating portion 40 is provided with a torque form deforming portion 40$d$ which deforms the torque form T1$f$ calculated by the torque form calculating portion 40$a$. In the third embodiment, the gain calculating portion 40$c$ is equivalent to the gain calculating portion 40$c$ of the second embodiment (FIG. 10) not including the rating-torque-gain calculating portion C3. Accordingly, the gain calculating portion 40$c$ calculates the optimum gain Ka and the cross prevention gain Kb, and calculates the minimum value of the gains Ka and Kb as the compensation gain K. The pulsation-compensating-torque calculating portion 40 calculates the pulsation compensating torque T1 by multiplying the torque form T1$f'$ obtained by the deformation by the torque form deforming portion 40$d$ by the compensation gain K having been calculated by the gain calculating portion 40$c$.

Figure 12:
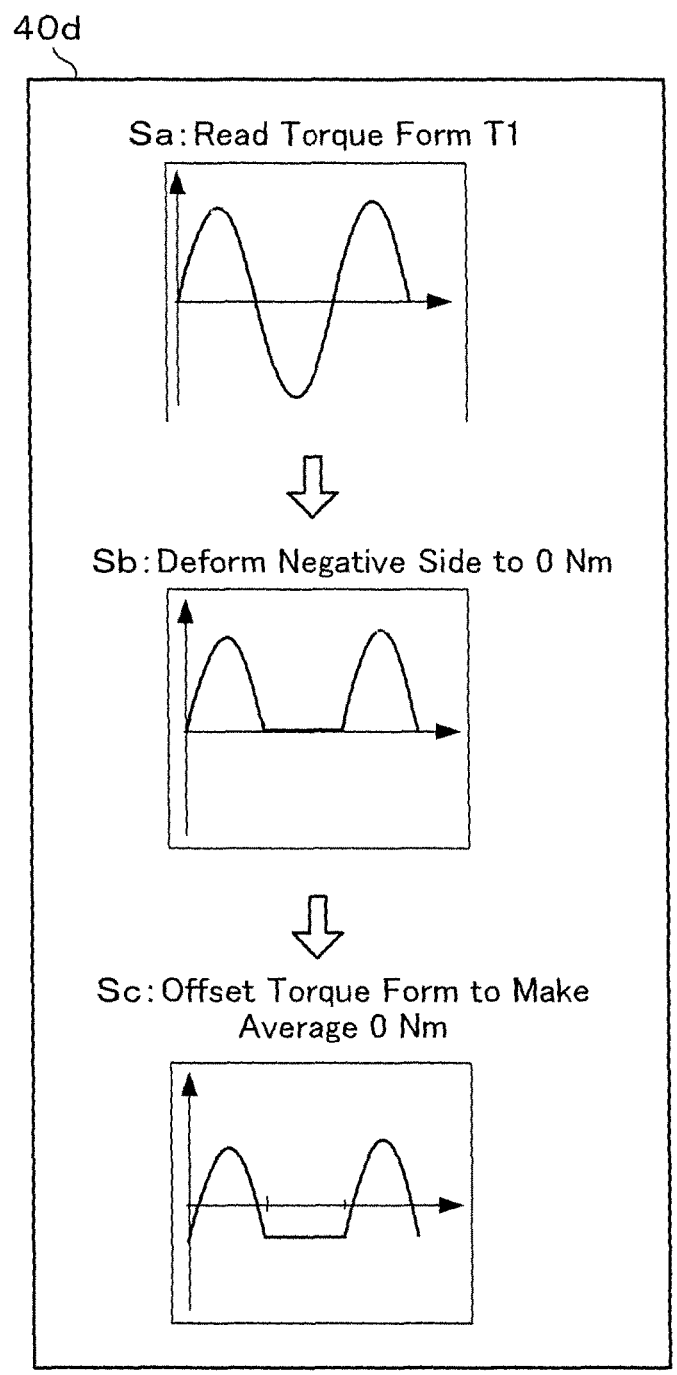
FIG. 12 is a diagram showing processing of a torque form deforming portion shown in FIG. 11.

As shown in FIG. 12, the torque form deforming portion 40$d$ deforms the torque form T1$f$ by executing steps Sa to Sc. First, at step Sa, the torque form deforming portion 40$d$ reads the torque form T1$f$ calculated by the torque form calculating portion 40$a$. Next, at step Sb, the torque form deforming portion 40$d$ deforms the negative side of the read torque form T1$f$ to 0 Nm. And then, at step Sc, the torque form deforming portion 40$d$ offsets the torque form deformed at step Sb so that the average of the deformed torque form becomes 0 Nm, and outputs the offsetted torque form as the torque form T1$f'$ after the deformation.

In the vehicle 1 shown in FIG. 1, with respect to the power dividing mechanism 6 which is configured as a single pinion type planetary gear mechanism, to the sun gear S the first motor generator 4 is connected, to the planet career C the internal combustion engine 3 is connected, and to the ring gear R the output gear 12 as the output portion for transmitting torque to the drive wheels 25 is connected. Accordingly, in a case where the internal combustion engine 3 rotates in a positive direction and also the output gear 12 rotates in a positive direction, the first motor generator 4 rotates in a negative direction with receiving mainly reaction torque of the internal combustion engine 3, and is operated as an electric generator. Accordingly, in a case the motor torque of the first motor generator 4 exceeds the rating torque in the negative side earlier than in the positive side. Therefore, by deforming the negative side of the torque form T1$f$ to 0 Nm at step Sb, and offsetting the deformed torque form T1$f$ at step Sc, it is possible to observe the rating torque of the first motor generator 4 on both of the positive and negative sides.

Fourth Embodiment

Next, a fourth embodiment of the present invention will be described in reference to FIGS. 13 and 14. The fourth embodiment is common with each above mentioned embodiment except for some matters of processing executed by the ECU 30. The descriptions of matters common with the mentioned embodiments are omitted, and the description and drawing of each mentioned embodiment should be used for reference as necessary.

In the fourth embodiment, in a case that it is insufficient to suppress torque pulsation because of restriction of the pulsation compensating torque T1 described in each above embodiment, an aid control is executed as well as the pulsation compensating control and pressing control. In the aid control, the second motor generator 5 is made to output aid torque for covering shortfall of the pulsation compensating torque.

Figure 13:
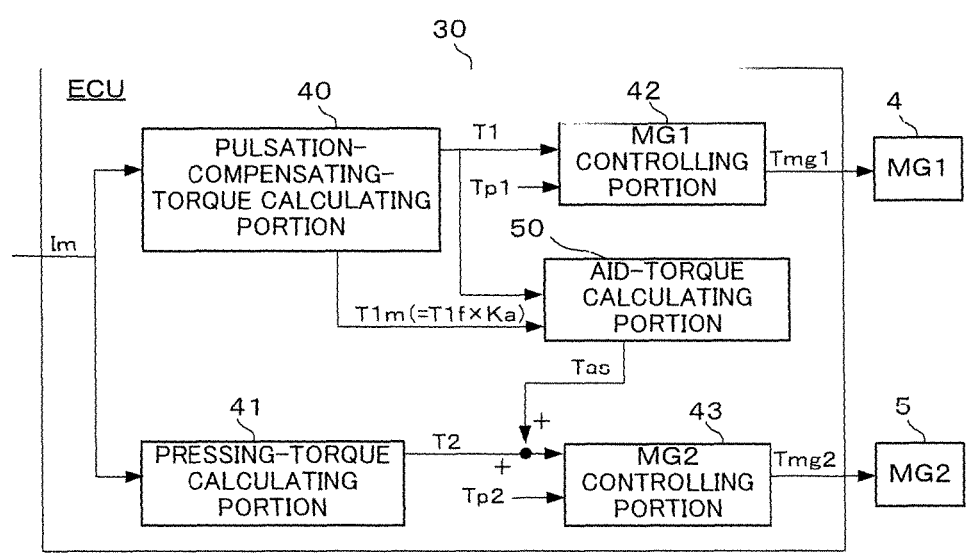
FIG. 13 is a block diagram showing a control system according to a fourth embodiment.

As shown in FIG. 13, in the ECU 30 of the fourth embodiment, an aid-torque calculating portion 50 is logically configured in addition to the pulsation-compensating-torque calculating portion 40, the pressing-torque calculating portion 41, the MG1 controlling portion 42 and the MG2 controlling portion 43. To the aid-torque calculating portion 50, the pulsation compensating torque T1 and optimum compensating torque Tim calculated by the pulsation-compensating-torque calculating portion 40 are inputted. The optimum compensating torque Tim is unrestricted and ideal torque capable of suppressing successfully the torque pulsation of the internal combustion engine 3. The pulsation-compensating-torque calculating portion 40 calculates the optimum compensating torque T1$m$ by multiplying the torque form T1$f$ by the optimum gain Ka, for example. The aid-torque calculating portion 50 calculates the aid torque Tas based on the pulsation compensating torque T1 and the optimum compensating torque T1m. The aid torque Tas calculated is added to the pressing torque T2 calculated by the pressing-torque calculating portion 41, and the pressing torque T2 after the addition is inputted to the MG2 controlling portion 43.

Figure 14:
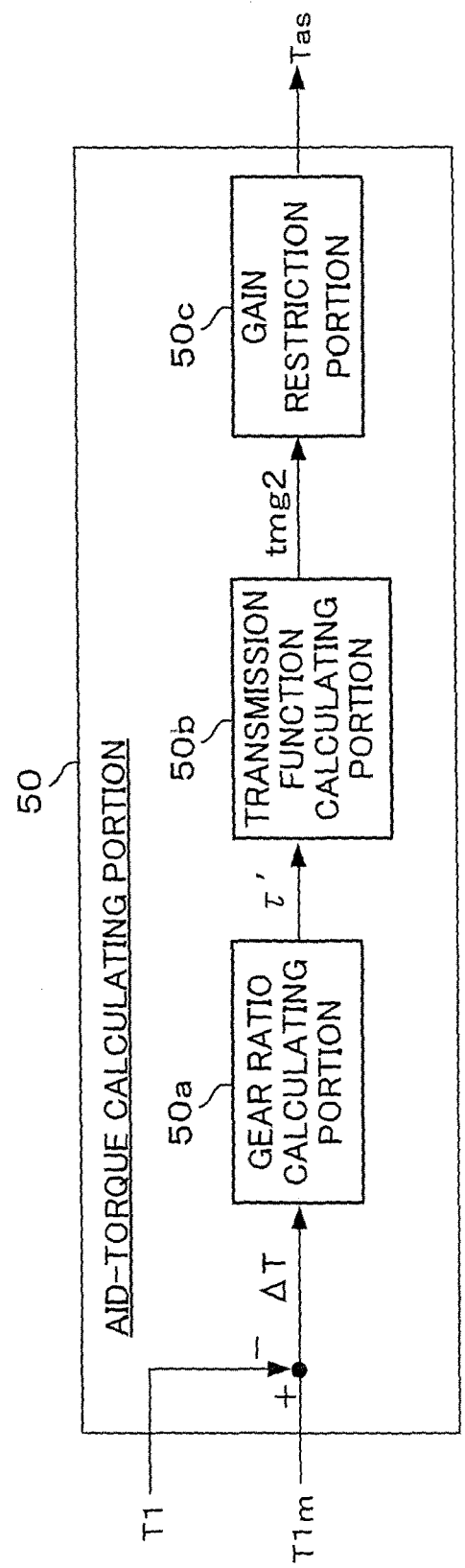
FIG. 14 is a block diagram showing a configuration of an aid torque calculating portion shown in FIG. 13.

As shown in FIG. 14, the aid-torque calculating portion 50 includes the following functional portions: a gear ratio converting portion 50a; a transmission function calculating portion 50b; and a gain restricting portion 50c. To the gear ratio converting portion 50a, a value obtained by subtracting the pulsation compensating torque T1 from the optimum compensating torque T1m, that is, the shortfall ΔT of the pulsation compensating torque T1 is inputted. The gear ratio converting portion 50a executes, with respect to the inputted shortfall ΔT, gear ratio conversion from a shaft of the sun gear S connected to the first motor generator 4 to a shaft of the career C connected to the internal combustion engine 3. The torque after the conversion is calculated as torque pulsation of the internal combustion engine 3 which the pulsation compensating torque T1 has failed to suppress. The transmission function calculating portion 50b calculates the transmission function from the engine torque to the torque of the shaft of the ring gear R as a constant number in consideration of characteristics of the torsional damper 10, and converts the torque pulsation τ' to the motor torque tmg2 of the second motor generator 5. The gain restricting portion 50c calculates the aid torque Tas with restricting the gain equal to or less than 1 so that the motor torque of the second motor generator 5 is prevented from crossing 0 Nm in a case where pulsation compensating control, the aid control, and the pressing control are executed.

According to the fourth embodiment, as a result of the restriction of the pulsation compensating torque T1, even if the pulsation compensating torque T1 is insufficient to suppress the torque pulsation, the shortfall is possible to be covered by the aid control where the second motor generator 5 is made to output the aid torque Tas. Thereby, it is possible to suppress the booming noise. Additionally, since the motor torque of the second motor generator 5 is prevented from crossing 0 Nm even if the aid control is executed, it is also possible to suppress the rattling noise.

The present invention is not limited to each above embodiment, and can be executed in various kinds of embodiments within the subject-matter of the present invention. The control apparatus of each above embodiment is applied to a so-called series-parallel hybrid electric vehicle. However, the control apparatus of the present invention is also possible to be applied to a parallel hybrid vehicle where two electric motors are provided on a power transmission path from an internal combustion engine to drive wheels. In each above embodiment, the first motor generator 4 as the first electric motor is provided on the power transmission path via the backlash. However, the control apparatus of the present invention can be executed regardless of whether the backlash exists or not.

In each above embodiment, the compensation gain K is restricted, and thereby the pulsation compensating torque T1 is restricted. However, the control apparatus of the present invention can be executed in such an embodiment that the pulsation compensating torque T1 is restricted without restriction of the compensation gain K.

EXPLANATION OF REFERENCES

1 Vehicle
3 Internal Combustion Engine
4 First Motor Generator (First Electric Motor)
5 Second Motor Generator (Second Electric Motor)
6 Power Dividing Mechanism
12 Output Gear (Output Portion)
25 Drive Wheels
30 ECU (Control Apparatus)
Ar Noisy Area

The invention claimed is:

1. A control apparatus for a hybrid vehicle, the hybrid vehicle having a first electric motor and a second electric motor on a power transmission path for transmitting output of an internal combustion engine to drive wheels, the second electric motor being connected to the power transmission path with a backlash existing therebetween, wherein
the control apparatus is configured as a computer, and by executing a computer program, configured to execute: a pulsation compensating control in which the first electric motor is controlled to output pulsation compensating torque for suppressing torque pulsation of the internal combustion engine; and a pressing control in which the second electric motor is controlled to output pressing torque for preventing motor torque of the second electric motor, which is transmitted to the power transmission path, from crossing 0 Nm.

2. The control apparatus according to claim 1, wherein the first electric motor is connected to the power transmission path with a backlash existing therebetween, and
the control apparatus is configured to restrict the pulsation compensating torque so that motor torque of the first electric motor is prevented from crossing 0 Nm in the pulsation compensating control.

3. The control apparatus according to claim 2, wherein the control apparatus is configured to execute, as well as the pulsation compensating control and the pressing control, an aid control which makes the second electric motor output aid torque for covering shortfall of the pulsation compensating torque, in a case where the torque pulsation of the internal combustion engine is insufficiently suppressed because of restriction of the pulsation compensating torque, and configured to restrict the aid torque so that the motor torque of the second electric motor is prevented from crossing 0 Nm in the aid control.

4. The control apparatus according to claim 2, wherein the power transmission path is provided with a power dividing mechanism which is configured as a single-pinion type planet gear mechanism including a sun gear being connected to the first electric motor; a planet carrier being connected to the internal combustion engine; and a ring gear being connected to an output portion for transmitting torque to the drive wheels, and
the control apparatus is configured calculate the pulsation compensating torque and to maintain a negative side of a torque form to 0 Nm, the torque form being a basis of the pulsation compensating torque, and offset the torque form deformed to make an average of the deformed torque waveform at least 0 Nm or greater, so that the motor torque of the first electric motor does not exceed a rating torque in the pulsation compensating control.

5. The control apparatus according to claim 1, wherein the control apparatus is configured to execute the pressing control as well as the pulsation compensating control, in a case where a required operation point defined by engine speed and engine torque of the internal combustion engine belongs to a noisy area set as an operation area where a noise occurs, the noise being caused by the torque pulsation of the internal combustion engine.

\* \* \* \* \*